J. W. TOLIVER.
SIGNAL.
APPLICATION FILED JUNE 12, 1920.
1,369,576.
Patented Feb. 22, 1921.
3 SHEETS—SHEET 2.
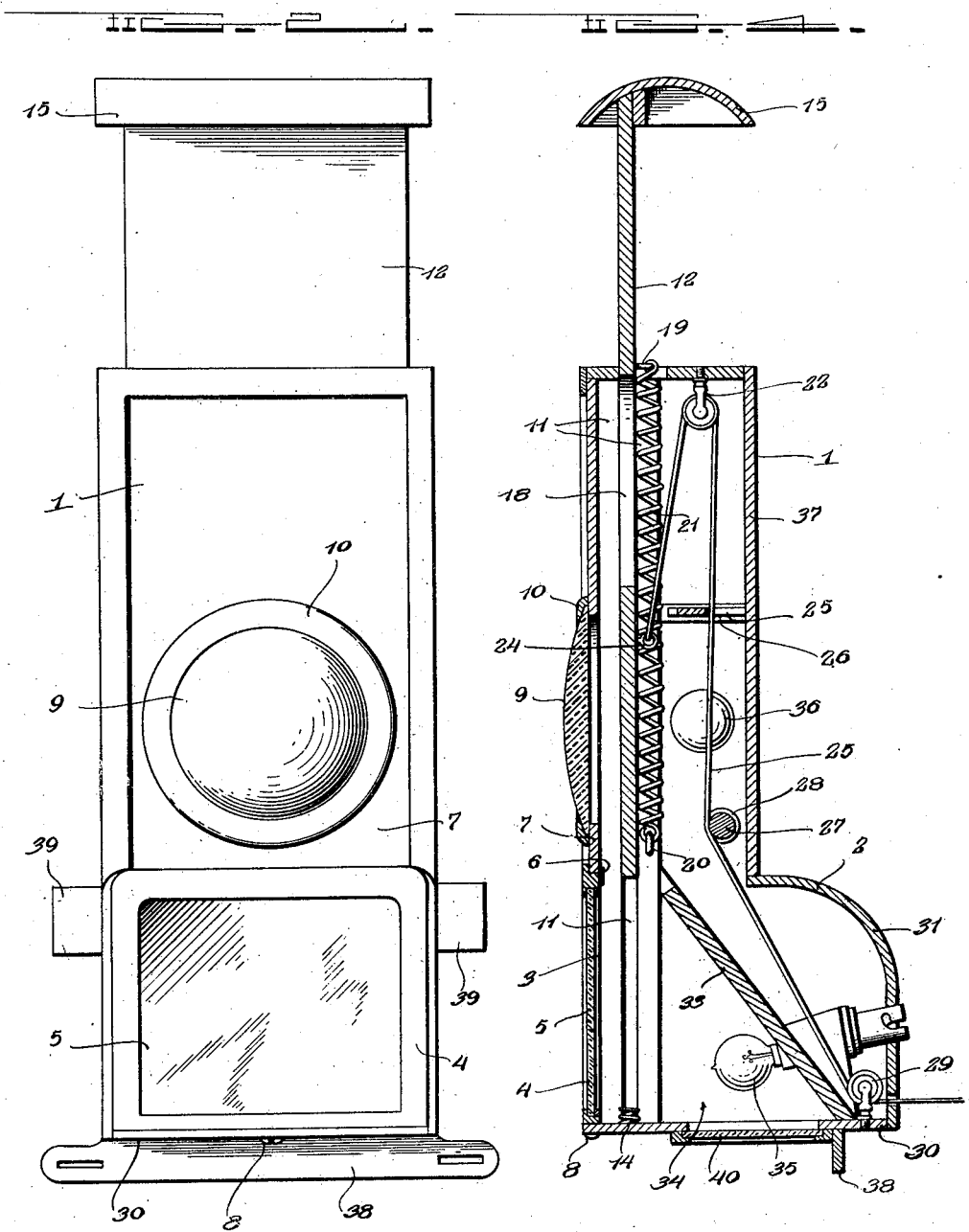
John W. Toliver
INVENTOR
BY Victor J. Evans
ATTORNEY

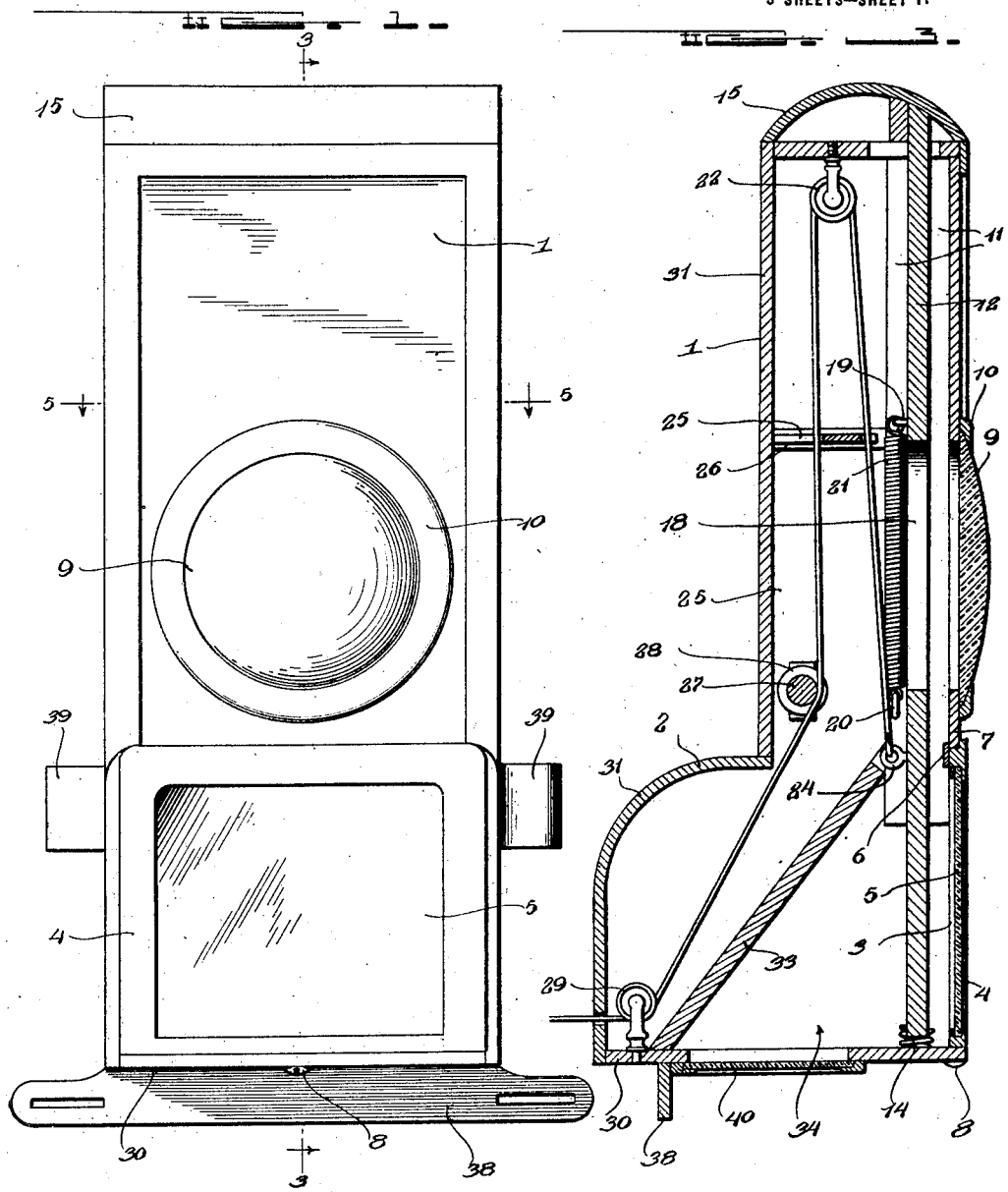

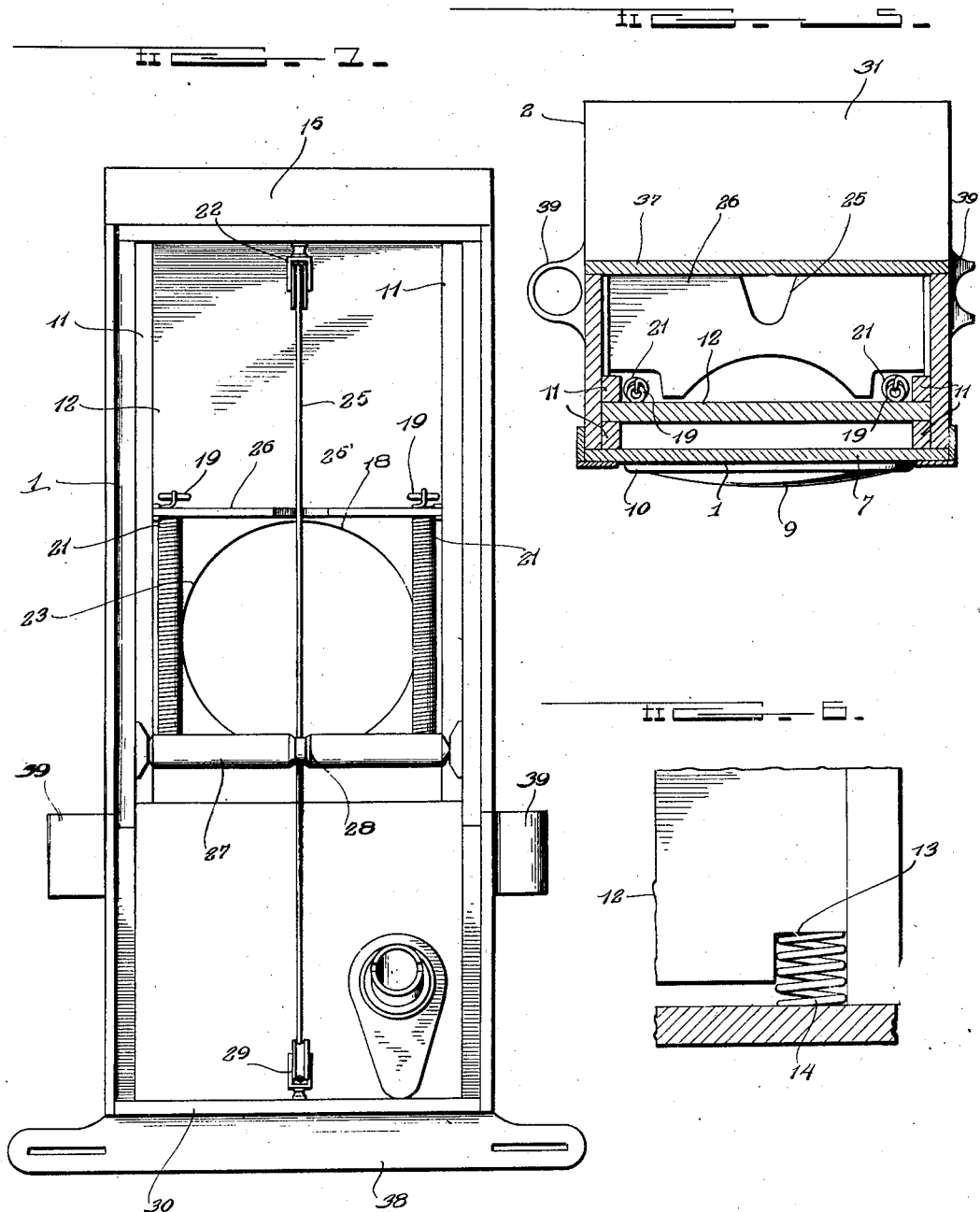

UNITED STATES PATENT OFFICE.

JOHN W. TOLIVER, OF CLEVELAND, OHIO.

SIGNAL.

1,369,576.  Specification of Letters Patent.  Patented Feb. 22, 1921.

Application filed June 12, 1920. Serial No. 388,509.

*To all whom it may concern:*

Be it known that I, JOHN W. TOLIVER, a citizen of the United States, residing at Cleveland, in the county of Cuyahoga and State of Ohio, have invented new and useful Improvements in Signals, of which the following is a specification.

The present invention relates to a signal for automobiles or similar vehicles.

The object is to produce a device of this character which will be conspicuously displayed either in daylight or darkness.

A further object is to produce a signal device for automobiles or the like which is in the nature of a tail lamp and in which the rays of light from lamps will be projected through different colored lenses in accordance with the course pursued by the vehicle, as for instance when the vehicle is traveling the rays of light from a lamp will be projected through a lens which is differently colored than those projected through another lens when the vehicle is standing still.

A further object is to produce a signal for automobiles or similar vehicles in which rays from a lamp will, in the night-time, be at all times directed to the license tag, and through a red lens when the vehicle is traveling, the said signal including a shutter that is slidable to cover the red lens and uncover a different colored lens so that the light rays will be projected through the latter when the vehicle is to be brought to a standstill, or is to take a course different from that straight ahead.

A further object is to produce a signal for automobiles in which a shutter is employed for covering or uncovering different colored lenses through which rays of light project in the night-time, the said shutter designed to be elevated in the daytime and being of a color to render the same conspicuous.

The foregoing objects, and others which will appear as the nature of the invention is better understood, may be accomplished by a construction, combination and operative arrangement of parts, such as is disclosed by the drawings.

In the drawings:—

Figure 1 is a front elevation of the improvement.

Fig. 2 is a similar view with the shutter in its projected or elevated position.

Fig. 3 is a sectional view approximately on the line 3—3 of Fig. 1.

Fig. 4 is a sectional view approximately on the line 4—4 of Fig. 2.

Fig. 5 is a transverse sectional view approximately on the line 5—5 of Fig. 1.

Fig. 6 is a fragmentary detail view showing the manner in which the lower edge of the shutter is engaged by one of the buffer members.

Fig. 7 is a rear elevation with the back plates removed.

As disclosed by the drawings my improved signal comprises a substantially rectangular casing 1 which, however, upon its rear face and adjacent its bottom is widened as indicated by the numeral 2. The front face of the casing is open for a determined distance from the bottom thereof, and the side walls, at the said opened portion have their inner faces depressed from the corners thereof to provide ledges 3 against which rest a frame 4 that carries a lens or colored translucent plate 5. The frame, on its inner edge, has a lip 6 which is designed to engage with the inner face of the face plate 7 of the casing, at the lower end thereof. Suitable removable securing means 8 is provided for sustaining the lens carrying frame 4 on the casing.

The face plate 7, at a suitable distance above the lens carrying frame 5 has a circular opening therethrough within which is seated a bull's-eye lens 9 which is differently colored from the lens 5. The color of the lens 9 is preferably red, that of the lens 5 is preferably blue. The bull's-eye lens 9 is retained over the opening in the face plate by a flanged ring 10 that is removably secured to the face plate.

In the casing 1, directly to the rear of the face plate 7 there are pairs of vertically disposed strips 11, secured to the sides of the casing and forming therebetween ways for a slide 12. The slide 12 is of a length corresponding to that of the casing, and has its lower corners notched as at 13, and the inner walls provided by the notches are in the path of contact with spring buffer members 14 that are secured to the closed bottom of the casing. The slide 12 passes through an opening in the top of the casing, and has on its outer edge a rounded shield 15 which protects the opening through which the slide passes. The slide has its lower portion, on its outer face differently colored from the upper portion thereof. Preferably the lower face of the slide is covered with a coating of black material as indicated by the numeral 16, and its upper portion coated with a red material as indicated by the numeral 17. The lower portion of the slide is, of course, normally disposed to the rear of the lens 5 in the frame 4, and the upper portion thereof has a round opening 18 therethrough which is normally arranged directly to the rear of the opening that is covered by the lens 9.

To retain the slide in its normal lowered position, whereby the opening 18 thereof is brought opposite the opening in the face plate covered by the lens 9, I employ spring means. To the inner face of the slide there are secured eye members 19. To the inner cleats 11, at a suitable distance below the eyes 19 are secured similar eyes 20. The opposed pairs of eyes 19 and 20 are arranged by the inner convolutions of helical springs 21.

To the top wall of the casing 1, inward of the slide I secure a pulley block 22. Connected to the inner face of the slide 12, below the round opening therein opposite the ends, (said opening being for distinction indicated by the numeral 23) as at 24 is a flexible element which may be in the nature of a chain or light cable. This element 25, is trained around the pulley block 22, and its outer strand passes through a notch 25 in a transversely arranged guard plate 26 connected between the sides of the casing and approximately in a line with the upper edge of the opening 23. Journaled transversely in the casing, approximately in a line with the lower wall provided by the opening 23 is a roller 27 that has a central groove 28, and the flexible element or cable 25 is received in the said groove and is trained around a pulley block 29 secured to the bottom wall 30 of the casing, at the widened end thereof. The cable passes through an opening in the lower back plate 31 for the casing, and is directed to a convenient point in the vehicle for operation by the driver. It will be apparent that a pull on the cable will move the slide upwardly of the casing, so that the lens 9 will be covered and the lens 5 will be uncovered.

In the lower portion of the casing, to the rear of the frame 4, and disposed at a downward or upward angle from the front to the rear of the casing is a partition 33 providing the portion of the said casing, between the frame and partition with a compartment 34.

In the compartment 34 is a light bulb 35, while directly to the rear of the opening 23 in the face plate of the partition is a similar bulb 36. These lamps are connected by suitable switch controlled conductors with a battery or other source of electric energy which may provide one of the component parts of the engine of the automobile.

Above the bottom back plate 31, the rear of the casing is closed by a second removable plate 37.

On the under face or bottom of the casing there is a bracket 38 to which the license tag is attached. On the sides of the casing, preferably at the widened portion thereof are sockets 39 whereby the casing is supported in the usual manner.

The bottom of the casing, forward of the bracket 38 is provided with an opening, the sides of which are formed with ways for the reception of a transparent plate 40. It should be stated that the inner face of the slide, the side walls of the compartment 34, the outer face of the partition 33, and the back plate 37 are colored with some light material, such as white paint or enamel, so that the rays from the light bulbs 35 and 36 will be freely projected. The rays from the light bulb 35 will at all times be transmitted through the transparent plate 40, and the rays from the light bulb 36 will normally be projected through the lens 9. When the flexible element is operated to elevate the slide and close the opening 23 the said slide will be brought away from the frame carrying lens 5, so that the light from the bulb 35 will be then projected through the said lens 5. This takes place in night driving, and a driver to the rear of the vehicle to which the improvement is attached, observing the blue or green rays from the lens 5, and also the white rays which are deflected on to the license tag will become aware that ordinary conditions do not exist, and consequently will steer clear of the vehicle. In daylight the projected slide will render the signal conspicuous, should it be found desirable to retain the said slide elevated, and it is thought that the foregoing description when taken in connection with the drawings will fully set forth the construction, operation and advantages of the improvement.

Having thus described the invention, what I claim is:—

A signaling device of the class described comprising a casing with separate upper and lower compartments, spaced lenses arranged on the face of said casing and having different colors, a source of light in each of said compartments, a slide between the light and the lenses, a pair of guideways arranged in said casing for said slide, a normally arranged hood on the outer end of said slide and over said casing, a spring means for moving said slide inward of said casing, buffer means engaging said slide when in such position, said slide having an opening in a line with the lens of said upper compartment, a cable operating means for said slide, guide means therefor, said operable means designed when actuated to influence the slide outward of said casing to bring the opening therein away from the lens in said upper compartment and to uncover said lens in lower compartment.

In testimony whereof I affix my signature.

JOHN W. TOLIVER.